(No Model.)

F. GRIMM.
POST HOLE AUGER.

No. 330,580. Patented Nov. 17, 1885.

WITNESSES
Percy C. Bowen.

INVENTOR
Fred. Grimm.
By his Attorneys

United States Patent Office.

FRED. GRIMM, OF COMANCHE, TEXAS.

POST-HOLE AUGER.

SPECIFICATION forming part of Letters Patent No. 330,580, dated November 17, 1885.

Application filed June 17, 1885. Serial No. 168,981. (No model.)

*To all whom it may concern:*

Be it known that I, FRED. GRIMM, a citizen of the United States, residing at Comanche, in the county of Comanche and State of Texas, have invented a new and useful Improvement in Post-Hole Augers, of which the following is a specification, reference being had to the accompanying drawings.

My invention relates to post-hole augers, the object being to provide the same with an improved construction of blade, and means for adjusting the blades composing the auger, whereby different sizes of post-holes may be bored.

With these ends in view the invention consists, first, in an improved construction of blade; second, in the means for adjusting and securing the same, and in the details of construction and combinations of parts hereinafter fully described, and pointed out in the claim.

Figure 1:
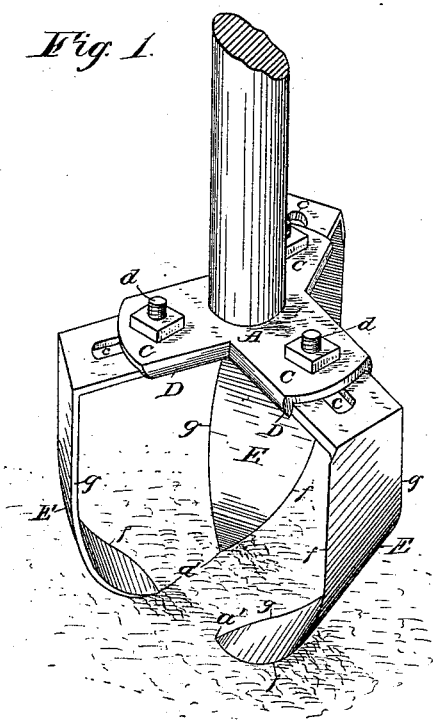
Figure 3:
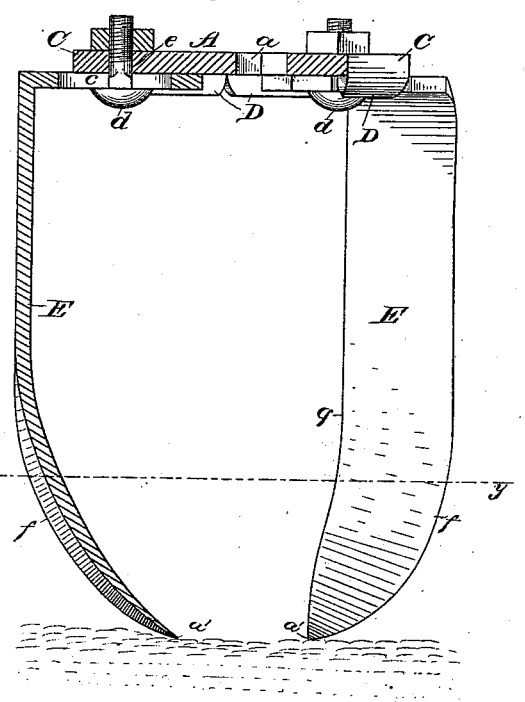
Figure 2:
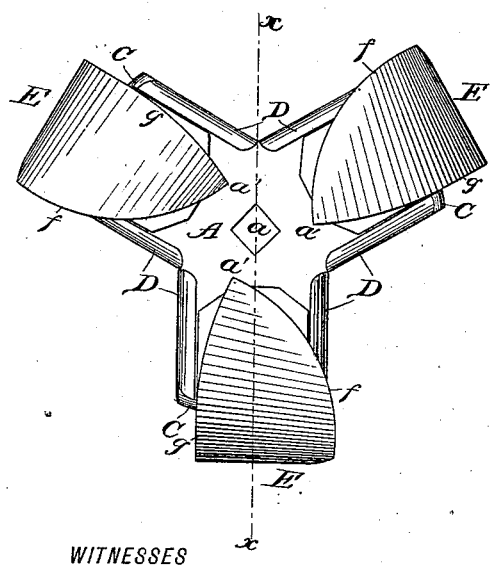
Figure 4:
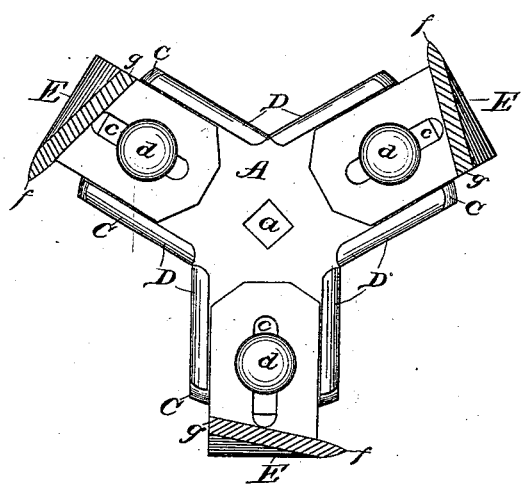

In the drawings, Figure 1 is a perspective view of a post-hole auger constructed in accordance with my invention. Fig. 2 is a bottom view. Fig. 3 is a section on the line $x\,x$ of Fig. 2, and Fig. 4 is a transverse section on the line $y\,y$ of Fig. 3.

In the accompanying drawings, in which like letters of reference indicate corresponding parts in all the figures, A represents a head or plate, which is provided with a centrally-located rectangular opening, $a$, adapted to receive a handle for operating the device. The head-plate A is provided with a series of outwardly-extending wings, C, in this case three, to receive three of the cutting-blades. It will be seen, however, that, if desired, four of these wings could be employed. The wings C are provided with downwardly-extending side flanges, D, which are adapted to serve as guides and to hold the upper ends of the cutting-blades E in place. The cutting-blades E are formed with the pointed lower ends, $a'$, in order that they may readily penetrate or enter the ground. The upper ends of the cutting blades or knives are formed with inwardly-extending arms, which fit between the downwardly-extending flanges of the wings C, which wings hold the blades against lateral movement. The arms are provided with elongated slots $c$, and engaging said slots are bolts $d$, the upper threaded ends of which pass through openings $e$ in the wings C. Engaging the threaded upper ends of the bolts are nuts which clamp the bolts in place to hold the blades in their proper position at any desired adjustment. It will be seen that by loosening the nuts the blades may be moved in the slots and secured at any desired adjustment to bore holes of different sizes. The lower ends of the cutting knives or blades are turned inwardly at their lower ends, as shown, toward a common center. Their cutting-edges $f$ extend vertically for about two-thirds of their length, extending from their upper ends, and near their lower ends the knives are turned outwardly, so that said cutting-edges will project beyond the rear or blunt edge $g$ of the adjacent cutter. By turning the lower ends of the cutting knives or blades inwardly the cutting-edges come in contact with the ground as well as the points, so that a hole may be readily and quickly bored.

If desired, the wings C might be made slightly convex, and the arms on the cutting-knives of a corresponding shape, so that when the knives were adjusted to their fullest extent they would not be so liable to be bent or broken.

In order to define the nature and scope of my invention, I would state that heretofore it has been proposed to provide a post-hole borer with a head-piece having vertical or slightly-inclined faces and grooves, in which are fitted the bent slotted ends of adjustable cutting-blades, which are curved longitudinally and bent to bring them to a common center. My invention differs from these constructions, in the fact that my operating-handle has a number of horizontal radial wings, which are provided on their under surface with ledges or flanges, between which are fitted the horizontal slotted arms of cutting-blades held adjustably by bolts and nuts. The lower ends of my cutting-blades are bent or curved inwardly and transversely, to bring the cutting-edges of points out of the plane of rotation of the blunt rear edge of the preceding cutting-blade, to obviate the danger of the cutting-edge of one blade striking against the blunt or other edge of its fellow cutter, which prevents dulling thereof.

Having thus described my invention, I claim—

The herein-described improvement in earth-augers, comprising an operating-handle having a series of radial horizontal wings provided on their lower faces with downwardly-projecting flanges D, cutting-blades E, having horizontal slotted arms at their upper ends adapted to fit between the flanges of the wings, said cutting-blades having their lower ends pointed and bent or curved inwardly and transversely, to bring the cutting-edge of one blade out of the plane of rotation of the rear blunt edge of the preceding blade, and adjusting bolts and nuts working through the slotted arms of the blades and the radial wings, as set forth.

In testimony that I claim the foregoing as my own I have hereto affixed my signature in presence of two witnesses.

FRED. GRIMM.

Witnesses:
CHAS. E. WILLIAMSON,
ROBT. M. GAVUER.